Oct. 17, 1944.  R. C. GEBERT ET AL  2,360,558
AXMINSTER SETTING FRAME AND PROCESS
Filed Oct. 15, 1943  6 Sheets-Sheet 1

FIG. 1.

Inventors:
Russell C. Gebert
Robert J. Carson Jr.
by their Attorneys
Howson & Howson Oct. 17, 1944.                R. C. GEBERT ET AL                2,360,558
                    AXMINSTER SETTING FRAME AND PROCESS
                       Filed Oct. 15, 1943       6 Sheets-Sheet 2

Inventors:
Russell C. Gebert
Robert J. Carson Jr.
by their Attorneys

Oct. 17, 1944.    R. C. GEBERT ET AL    2,360,558
AXMINSTER SETTING FRAME AND PROCESS
Filed Oct. 15, 1943    6 Sheets-Sheet 3

Inventors:
Russell C. Gebert
Robert J. Carson Jr.
by their Attorneys
Howson & Howson

Inventors:-
Russell C. Gebert
Robert J. Carson Jr.
by their Attorneys

Oct. 17, 1944.  R. C. GEBERT ET AL  2,360,558
AXMINSTER SETTING FRAME AND PROCESS
Filed Oct. 15, 1943  6 Sheets-Sheet 6

Inventors:
Russell C. Gebert
Robert J. Carson Jr.
by their Attorneys
Howson & Howson Patented Oct. 17, 1944

2,360,558

UNITED STATES PATENT OFFICE 2,360,558

AXMINSTER SETTING FRAME AND PROCESS

Russell C. Gebert, Elkins Park, Pa., and Robert J. Carson, Jr., Lexington, Va., assignors to Charles P. Cochrane Company, Bridgeport, Conn., a corporation of Pennsylvania Application October 15, 1943, Serial No. 506,406

19 Claims. (Cl. 28—55.5)

This invention relates to Axminster setting frames; and more particularly to a setting frame adapted for use in the winding of tuft spools for a loom weaving "drop-match" patterns, i. e. patterns composed of multiples of two or more different basic design units of equal dimensions distributed throughout the pattern in predetermined order, and which respectively constitute rectangular sub-areas of the complete collective pattern, with the several basic units arranged in edge abutting relation to each other, warpwise and weftwise of the carpet, and with the several basic units interchanged as to their respective positions through the complete pattern.

Normally the overall width of a drop-match pattern is equal to the width of the carpet, and is initially broken down into two or more equal divisions, weftwise of the carpet, with each division made up of two or more of the interchangeable basic design units in laterally abutting relation to each other.

One tuft spool is required on each spool frame in the loom for each of the initial divisions of the collective pattern; and the tuft spools for all of the initial divisions for any one line of tufts across the full width of the carpet are arranged in axial alignment with each other on the spool frame representing that particular line of tufts from selvedge to selvedge of the carpet.

The basic design units are usually nine inches in width, and the axial lengths of the tuft spools are made in multiples of nine, i. e. twenty-seven inches, thirty-six inches, or fifty-four inches.

For the purpose of illustration, in the case of the present invention, let it be assumed that the spools are of the thirty-six inch lengths, i. e. equal to the combined widths of four of the basic design units. Normally, in setting up the yarns for winding on a thirty-six inch tuft spool, a thirty-six inch section of the pattern draft, representing one initial division spool, is placed on the reading board of the setting frame. Two operators normally work together as a crew on each setting frame, and each operator reads half of the thirty-six inch section of the pattern draft and arranges one-half of the required number of the yarn packages for the depicted pattern section on the respective spindles covering one longitudinally extending half of the width of the setting frame accordingly.

For the purpose of economy, which prompts the weaving of drop-match patterns, only two basic design units are frequently employed. Each unit is arranged to appear twice across the width of the thirty-six inch section of the pattern draft, with the basic design units alternating across the draft of the pattern.

Normally, under the above-noted circumstances, each setter is required to read and set yarns for each of the different basic units depicted on her particular half of the pattern draft. This practice involves duplication of the work done by each of the two crew members.

One of the objects of the present invention is to provide a setting frame for drop-match patterns which will require each member of the frame crew to read and set yarns for but one basic design unit, thus cutting the work of each setter in half, insofar as this particular phase of each setter's duties is concerned. An advantage and material saving accruing to this phase of the invention is that only one draft of each basic design unit is required, as against at least two, under the usual practice.

Another object of the invention is to provide a setting frame whereby, in reading from the small section of the pattern draft depicting but a single basic unit of the complete pattern, each setter can set up the yarns for two identical units simultaneously, on relatively spaced but corresponding parts of the setting frame.

Each setting frame is equipped with a comb or reed through the dents or slots of which the yarns from the different packages, after the packages have been set in predetermined positions respectively on the table of the setting frame, are drawn during the winding of a loom spool, so that various yarns will occupy their proper positions on the tuft spools.

Another object of the present invention is to make the reed in a number of interchangeable sections to afford relative shifting of the reed sections, while retaining the yarns in the dents thereof, whereby the positions of the yarns for one of the duplicate basic design units set up by each crew member may be interchange on the tuft spool about to be wound, while the yarn packages from which the yarns passing through the dents of the reed are drawn, remain stationary in the positions on the table of the setting frame where they had been placed by the crew members when setting up their respective design units in duplicate.

Referring to the drawings.

Figure 1:
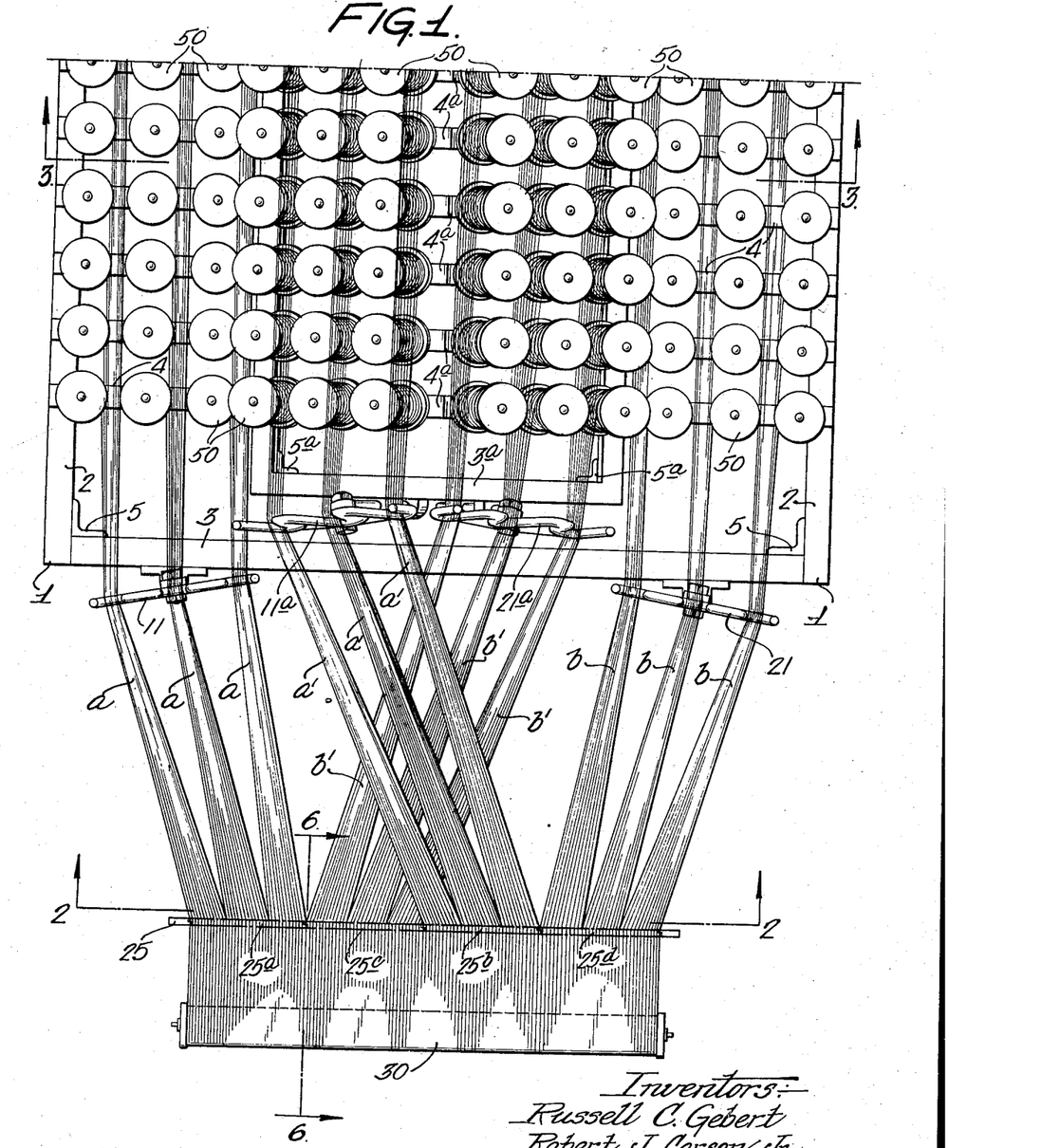
Fig. 1 is a plan view of the front end of a setting frame constructed in accordance with the principles of the present invention.
Figure 2:
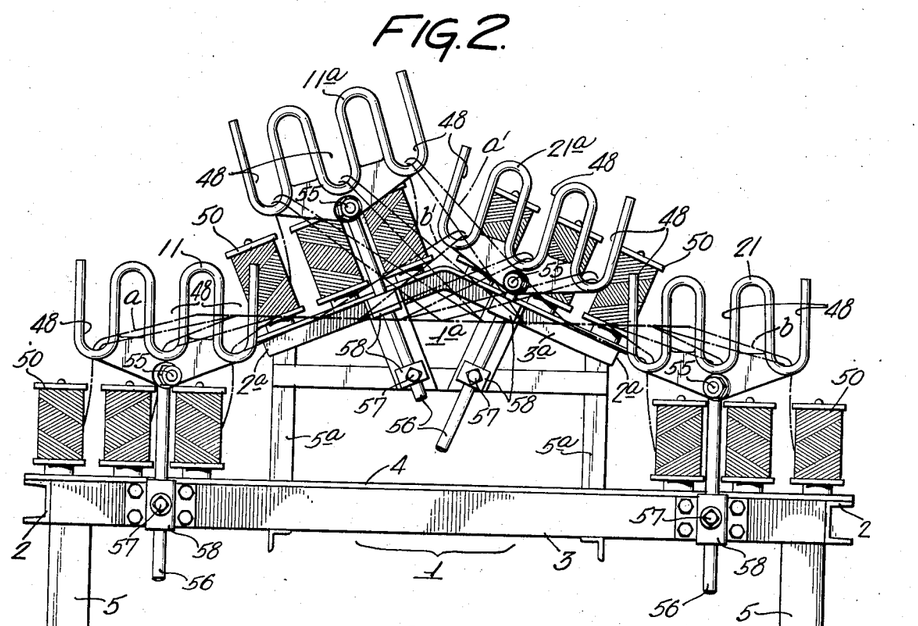
Fig. 2 is a front elevation, as viewed from the line 2—2, Fig. 1.
Figure 3:
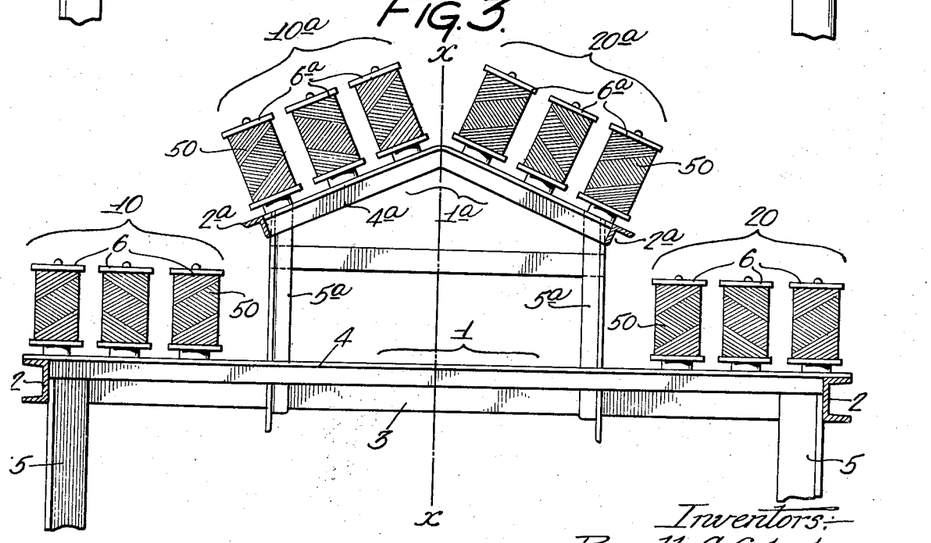
Fig. 3 is a transverse sectional elevation as taken on the line 3—3, Fig. 1.

A setting frame, made in accordance with the present invention may as shown in Figs. 1, 2 and 3, include a main horizontal frame or table 1. The table 1, in the present instance comprises laterally spaced parallel side members, in the form of channel beams 2, 2, and transverse end members in the form of channel beams 3. The table 1 also includes a plurality of transversely extending intermediate members in the form of angle irons 4, 4.

The opposite extremities of the end members 3 and intermediate members 4, 4 are rigidly secured to the side members 2, 2, in any suitable manner, as by welding, etc. The table 1 is provided with suitable legs 5, 5 which may also be welded or otherwise rigidly secured to the table 1.

The table 1 is also provided with a superstructure 1a formed of side members 2a, 2a, end members 3a and intermediate cross members 4a rigidly connected to the side members 2a, 2a. Legs 5a, 5a are welded or otherwise secured to the side beam 2a, 2a of the superstructure, and to any suitable part of the main table 1, such as the end members 3, 3, supports the superstructure or complementary table 1a at a predetermined elevation above the main table 1.

Figure 4:
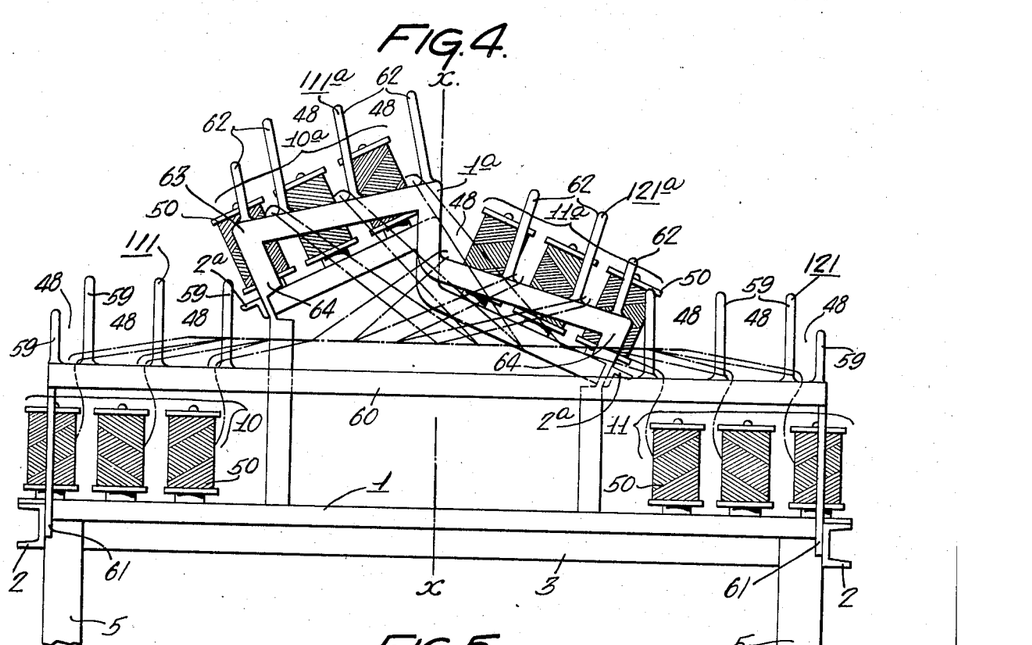
Fig. 4 is a front elevation illustrating a modified construction.
Figure 5:
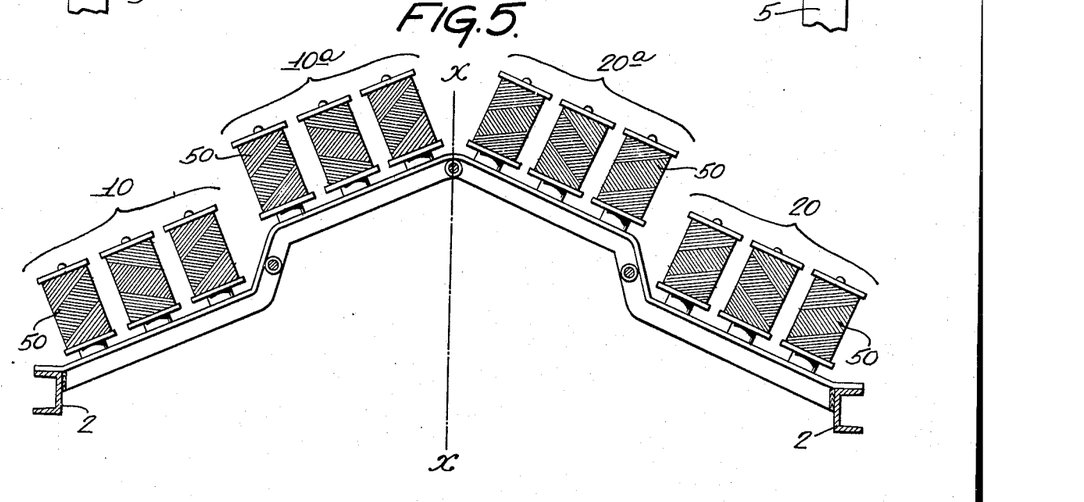
Fig. 5 is a transverse sectional elevation similar to Fig. 3 but showing a further modification.

The cross members 4a, 4a of the superstructure 1a are arranged at downwardly diverging angles on opposite sides respectively of the vertical median plane x—x of the setting frame as a whole, as shown in Fig. 3, Fig. 4 or Fig. 5.

The main table 1 and the complementary 1a are each provided with a plurality of spindles 6, 6 and 6a, 6a, which are secured to and project perpendicularly from the cross bars 4, 4 and 4a, 4a respectively, for rotatably supporting a plurality of series of yarn spools 10, 10a and 20, 20a, in separate banks at varying elevations respectively.

At one end of the setting frame are provided yarn-group guides 11, 11a, 21, 21a which may be fixed in their positions with respect to the frame as shown in Fig. 4, or which may be independently adjustable with respect to the frame and to each other as shown in Figs. 1 and 2.

As shown in Fig. 1, reed 25 is disposed in a vertical plane spaced some distance from the table 1 and parallel to the end member 3 thereof. The reed 25, as shown in Figs. 1 and 7 is composed of a plurality of interchangeable sections 25a, 25b, 25c and 25d, one of which is shown in detail in Fig. 8. The reed 25, as shown in Figs. 6 and 7 is removably supported in a deep groove 26 formed in a stationary head 27 which constitutes a part of a conventional setting frame.

The reed 25 is disposed intermediate of setting frame table 1 and the spool winding mechanism of the setting frame, which normally comprises a pair of lower rolls 28, 28 rotatably mounted in suitable fixed bearings, and an upper winding roll 29 which is adapted to be moved into and out of position with respect to the two rolls 28, 28 for rotatably supporting and rotating a loom spool 30. This mechanism is of the conventional type and forms no part of the present invention per se.

Figure 6:
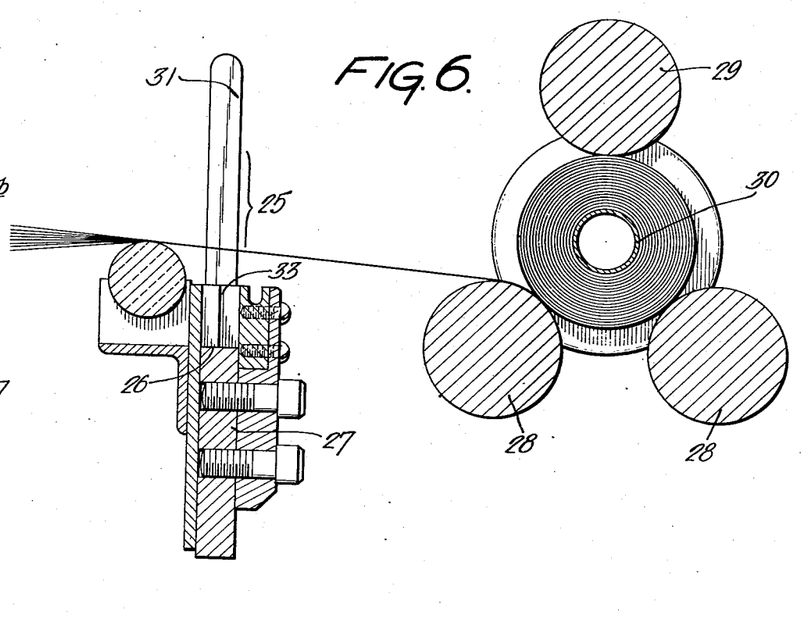
Fig. 6 is a cross section through the reed, as taken on the line 6—6, Fig. 1, drawn to an enlarged scale.
Figure 7:
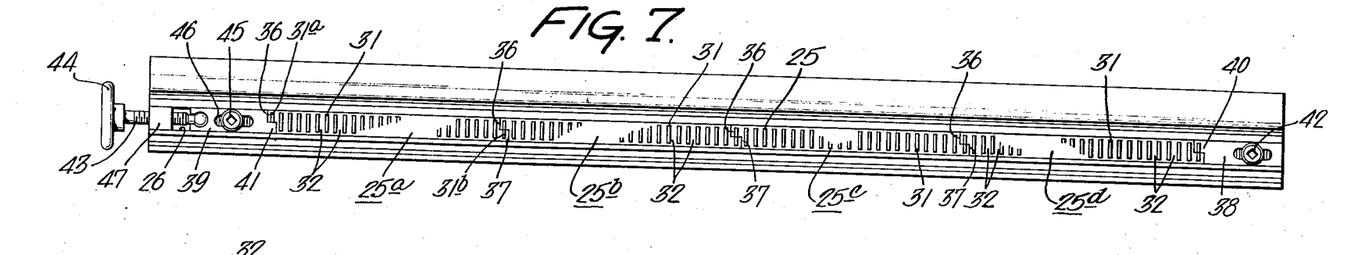
Fig. 7 is a plan view of the reed and its holder.
Figure 8:
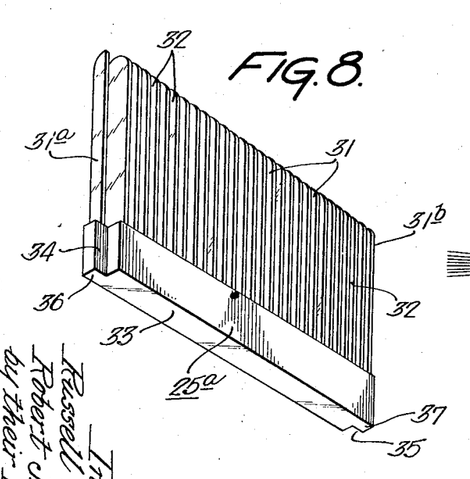
Fig. 8 is a detached prespective view of one of the reed sections looking upwardly at the under side thereof.

As shown in Figs. 6, 7 and 8, the reed or comb 25 includes a multiplicity of upwardly extending blades 31, 31 spaced apart as shown at 32—32 to form the dents of the reed through which the various yarns are adapted to pass. The upper ends of the blades 31 are disconnected while the lower ends are rigidly mounted in a suitable base 33, which is adapted to set in the groove 26 and support the blades 31 in a vertical position.

As shown in Figs. 7 and 8 the base 33 of each of the comb sections is oppositely rebated, as shown at 34 and 35. In the outwardly projecting portions 36 and 37 of the rebated ends of the base 33 of each reed section are secured half-blades 31a and 31b respectively. As shown in Fig. 7 the rebated ends of the bases 33 of the various sections 25a, 25b, 25c and 25d interfit with each other and the adjoining half-blades at the opposite ends of each of the two middle sections are lined up with each other in common planes to form a complete blade.

In order to support the comb 25 rigidly in the head 27, the opposite ends of the groove 26, in which the reed is mounted, are provided with clamping blocks 38 and 39 respectively. These blocks are provided with rebated ends 40 and 41 respectively which interfit with the rebated adjacent ends of the two outside reed sections. The clamp block 38 is adapted to be rigidly secured in place, after initial adjustment by a screw or bolt 42 passing through a longitudinal slot formed in the block 38 and threaded into a tapped opening formed in the head 27, while the clamping block 39 is adapted to be moved longitudinally within the groove 26, frequently, by a screw 43 provided with a hand wheel 44, said block being guided in its longitudinal movement, and at the same time being held within the groove 26, by a bolt or screw 45 passing through a slot 46 formed in the block 49 and threaded into a tapped opening formed in the head 27. The clamping screw 43 is threaded through a suitable nut 47 which is rigidly secured in the one end of the groove 26.

As shown in Fig. 1, the yarn packages, in the form of spools 50, are disposed in longitudinal and transverse rows in the banks 10, 10a, 20a and 20 on the main table 1 and supplementary table 1a respectively. The individual yarns from the spools 50, 50 in each longitudinal row are grouped together as they extend lengthwise of the table as shown at a, a1 b, b1, Fig. 1. These groups are lead separately through deep recesses 48, 48, formed in the various guides 11, 11a and 21a, 21, to the sections 25a, 25b, 25c and 25d of the comb 25, where the individual threads of each group are separated by the blades 31 of the reed sections and pass, in parallel relation, from the dents 32 of the various reed sections to the loom spool 30 upon which the individual threads are to be wound in lateral adjacent relation to each other.

Figure 9:
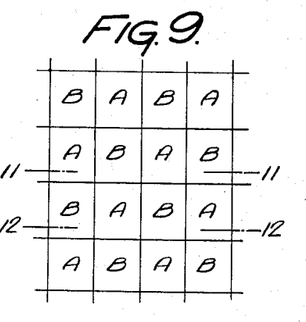
Fig. 9 diagrammatically depicts one initial division of a complete drop-match pattern illustrating the relative positions of two basic design units therein.

In order that the present invention may be more readily understood, reference is made to Fig. 9, wherein a drop-match pattern employing two different separate and distinct basic design units, A and B as depicted diagrammatically, with these units arranged in alternating relation to each other, in both longitudinal and transverse rows.

In setting up the yarn packages for the simple form of design shown in Fig. 9, one of the two crew members is provided with a pattern draft of the unit A only, and the other with a pattern draft of the unit B only.

Each crew member sets up the spools 50 for her particular unit in their proper places on the main table 1 and the supplementary table 1a, i. e. the one crew member sets up the spools in the bank 10, along one side of the main table 1 for one unit A, and simultaneously sets up the spools for an identical unit A in identical spots respectively in the bank 10a along the corresponding side of the supplementary frame 1a; while the second crew member, in the same manner, sets up the spools for two identical B units in the banks 20 and 20a respectively on the opposite side of the main and supplementary tables 1 and 1a respectively.

The two crew members respectively draw the yarns from the spools of the banks 10, 10a and 20, 20a and place each yarn in its proper guide 11, 11a 21, 21a, as the case may be. Each yarn is then laid in its proper dent 32 in the proper reed section 25a, 25b, 25c or 25d as the case may be, until every tuft spot in the current transverse line of each pattern draft, such as the line 11—11, Fig. 9 is accounted for.

The drawing and laying of the yarns in the manner above noted assembles the yarns in the groups a, a1 b and b1 respectively, with the groups a, a, passing from the bank 10 to the reed section 25a, the groups a1, a1, from the bank 10a to the reed section 25b, the groups b1, b1 from the bank 20a to the reed section 25c, and the groups b, b from the bank 20 to the reed section 25d.

Figure 11:
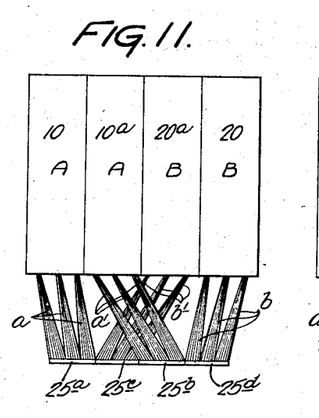
Figs. 11 and 12 respectively illustrate the relatively interchanged positions of the reed sections during winding of successive loom spools respectively.

In order to bring the individual yarns for the units A, A and B, B which are in the comb sections 25a, 25b, 25c and 25d respectively, into their proper relationship to produce the units A and B in alternating relation across the carpet for the line 11—11, Fig. 9, the reed positions of the middle reed sections 25b and 25c are interchanged as shown in Fig. 11, with the various sections in the order 25a, 25c, 25b, 25d from the left to right.

Figure 12:
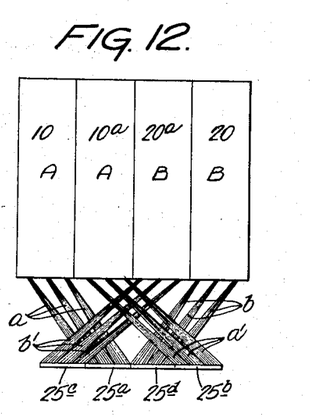

When the desired number of loom spools 30 are wound for this particular line in the pattern the reed sections are interchanged, as clearly shown in Fig. 12, in the order 25c, 25a, 25d, 25b from left to right to wind a set of loom spools with the same identical yarns for a line of tufts in the next repeat of the pattern, such as the line 12—12, Fig. 9. Thus the yarns for two lines of tufts are wound for only one setting of the yarns, merely by shifting the reed sections. After the desired number of loom spools for the lines 11—11 and 12—12 are wound, the reed sections are returned to their original positions of Fig. 10 and a set up is then made for the next succeeding line of tufts, after which the reed sections are switched again as noted, and so on until the entire length of two longitudinal repeats of the basic units A and B are finished.

In order to keep the yarns of the various groups a, a1, b, b1 from rubbing against each other during their crossed condition while a loom spool is being wound, the guides 11, 11a 21, 21a are set at various angles with respect to the vertical horizontal and with respect to each other. In the structure shown in Figs. 1 and 2, provision is made for universally adjusting each guide, in order that the proper angle for each may be readily attained.

In this instance of Figs. 1 and 2 each guide is pivotally mounted and is adapted to be rigidly clamped in its adjusted position on and by a bolt 55 mounted in a suitable head on a spindle 56, which latter may be moved longitudinally through, rotated, and rigidly clamped by set screws 57 in one or more suitable socket bearings 58 secured to rigid end portions 3 and 3a of the table 1 and superstructure 1a, as the case may be.

In Fig. 4 the guides 111, 111a, 121 and 121a are shown as being rigidly mounted on the main table 1 and supplementary table 1a. The guides 111 and 121 in this instance, are formed by pins 59, 59 projecting upwardly from a bar 60 which is rigidly mounted on and projects outwardly from one end of the main table 1, said bar being supported by hackets 61, 61 from side members 2, 2 of the main table 1.

The guides 111a and 121a are similarly formed by pins 62 projecting upwardly from a bent bar 63 having downwardly extending end legs 64, 64 secured to the ends of the side bars 2a, 2a of the superstructure 1a.

In order to facilitate the placing and replacing of the spools 50, 50 on the spindles 6 and 6a in the spool banks 10, 10a, 20, 20a, the spindles of the banks 10a and 20a preferably (see Figs. 3 and 4), and those of the banks 10 and 20 if desired (see Fig. 5), may be disposed at an angle to the vertical, and preferably with the planes of the banks 10a and 20a at higher elevations than the planes of the banks 10 and 20 respectively.

In Fig. 2 the planes of the banks 10a and 20a are disposed at corresponding angles to the vertical at opposite sides respectively of the longitudinal vertical median plane x—x of the setting frame, and the banks 10 and 20 are in a common horizontal plane on the top surface of the main frame 1, along the outside edges of the main table 1.

In Fig. 5 the banks 10 and 10a and 20 and 20a are shown as being at similar angles but at different elevations. In Fig. 4 the planes of the banks 10a and 20a are shown as being at different elevations.

The tipping of at least the two central banks 10a and 20a at an angle to the vertical and horizontal greatly facilitates the placing of the spools 50, 50 on and the taking of the spools off the spindles without requiring the crew members to reach and stretch into uncomfortable positions. The placing of the spools 50 on and taking of these spools off the spindles in the banks 10 and 20 may also be greatly facilitated by placing these banks on an incline also, as shown in Fig. 5.

Figure 13:
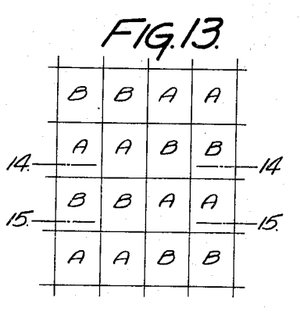
Figs. 13, 14 and 15 diagrammatically illustrate basic units of double width or single units paired.
Figure 14:
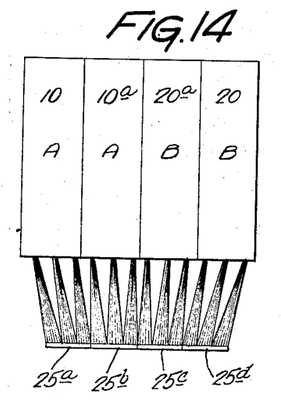
Figure 15:
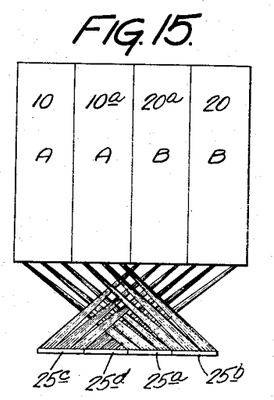

Figs. 13, 14 and 15 illustrate a pattern wherein the identical units A are used in pairs, and wherein the identical units B are likewise used in pairs across the width of the carpet, as shown in Fig. 13, or wherein single basic units of double width are employed. Fig. 14 shows the positions of the reed sections during the setting up of the spools 50 in the bank 10, 10a and 20, 20a, which are the positions these retain during winding of the loom spools 30 for the tuft lines, such as 14—14, Fig. 13, while Fig. 15 shows the relative shifting of the reed sections 25a and 25b for the sections 25c and 25d in winding the loom spools 30 for tuft lines or rows such as that denoted by the line 15—15, Fig. 13.

Figure 16:
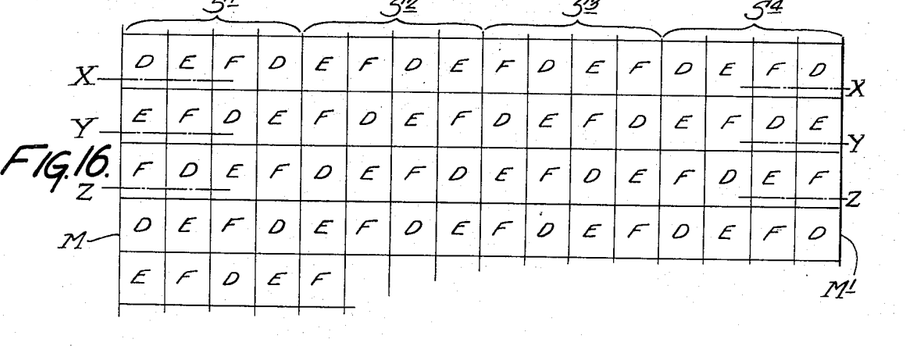
Figs. 16, 17, 18 and 19 illustrate a modified pattern using three different basic design units.

Fig. 16 illustrates a pattern employing three different and distinct basic design units D, E, F, arranged in regular alphabetical sequence longitudinally and transversely of the carpet. As a matter of illustration, these units are each of the nine inch width variety. The carpet from one marginal selvedge M to the opposite marginal selvedge M1 is initially divided into four sections S1, S2, S3, S4. For each line X—X, Y—Y and Z—Z, Fig. 16, four loom spools 30, 30 will be required.

Figure 17:
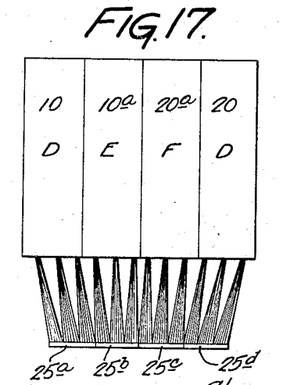

One spool 30 would be wound for each of the sections S1, S2, S3 and S4. As noted in Fig. 16, the sections S1 and S4 are alike, i. e. each includes two units D, D, one E and one F. A setup such as shown in Fig. 17 would be employed in winding the loom spools for sections S1 and S4, with the yarn package spools 50 for the units D, D in the banks 10 and 20 respectively and the spools 50 for the units E and F in banks 10a and 20a respectively. The yarns for the first unit D would pass through the dents in the reed section 25a, those for the unit E would pass through the reed section 25b, those for unit F through reed section 25c, and those for the second D unit through reed section 25d.

Figure 18:
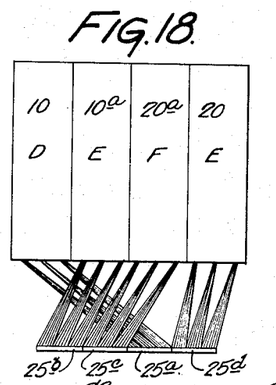

A setup such as that shown in Fig. 18 would be employed for winding the loom spool 30 for the section S2. It will be noted in this case that the yarn package spools 50 for the second unit D, in the bank 20, are replaced by yarn package spools for a second unit E as shown in Fig. 18; and for winding the loom spools for section S3, the yarn package spools for the second unit E are replaced by those for a second unit F, as shown in Fig. 19.

Figure 19:
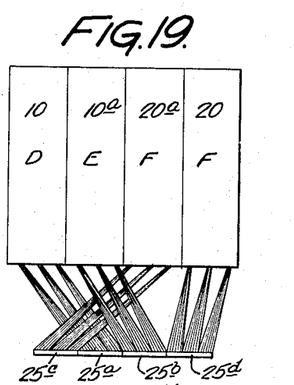

In the winding of the loom spools for the sections S2 and S3 the positions of the reed sections 25a, 25b, 25c and 25d are interchanged, as shown in Figs. 18 and 19 respectively.

It will also be noted in Fig. 16, that the various combinations of the units D, E and F as set up for the tuft spools 30 for the line X—X are repeated in the lines Y—Y and Z—Z, with the combinations remaining the same but used in the different sections of the carpet, i. e. for the tuft line Y—Y the order is E—F—D—E for section S1; F—D—E—F for section S2; D—E—F—D for section S3; and E—F—D—E for section S4. For the tuft line Z—Z, the order is F—D—E—F for section S1; D—E—F—D for section S2; E—F—D—E for section S3; and F—D—E—F for section S4.

Figs. 20, 21, 22 and 23, illustrate the arrangement used for winding loom spools using three basic design units thereon, such as twenty-seven inch loom spools with three nine inch design units, or thirty-six inch loom spools with three twelve inch design units. If the latter is the case the four-section thirty-six inch reed 25 would be replaced by a three-section reed 25'. These sections are designated as 25e, 25f, 25g in Figs. 21, 22 and 23.

Figure 20:
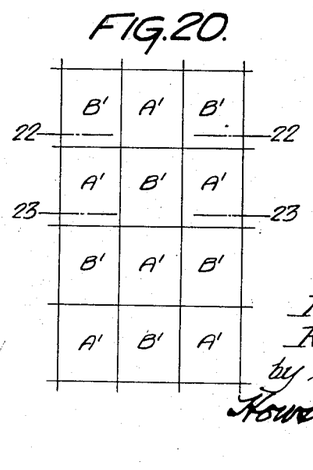
Figs. 20, 21, 22 and 23 illustrate a pattern employing twelve inch basic units.
Figure 21:
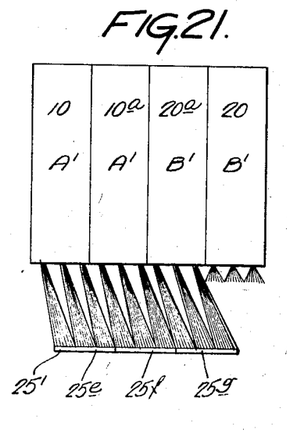
Figure 22:
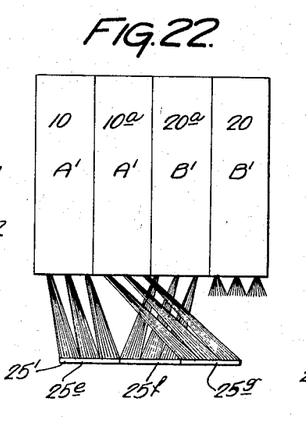
Figure 23:
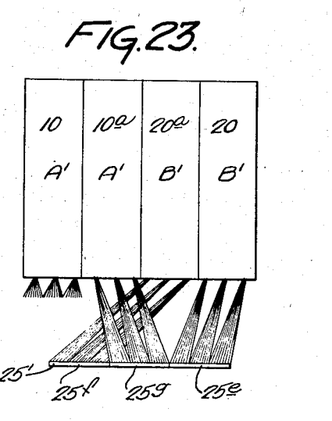

The original set up is made in the banks 10, 10a, 20a and 20 as shown in Fig. 21, i. e. two A1, A1 and two B1, B1 but the yarns for only the two units A1, A1 and one of the units B1 are drawn through the reed dents, the yarns for the second B section being left hanging free. To wind the loom spools for line 22—22, Fig. 20 the reed sections are interchanged as shown. To wind the loom spools for the line 23—23, Fig. 20, the yarns for the first unit A1 are dropped from the reed section 25e and the hanging yarns of the second B1 section inserted in place thereof. The reed sections are then interchanged as shown in Fig. 23.

Figure 10:
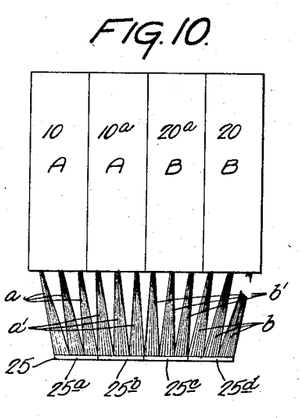
Fig. 10 illustrates diagrammatically the positions of the reed sections for the two design units while these units are being set up in duplicate on the table of the setting frame and up until winding of a loom spool.

If three nine inch units are being wound on a twenty-seven inch spool, the four nine inch sections 25a, 25b, 25c and 25d would be included in the reed 25 and the setup for the A1, A1 B1, B1 units would be made the same as in Fig. 10; however, in winding the twenty-seven inch loom spool for the tuft line 22—22, Fig. 20, the yarns from the second B1 unit (Fig. 22) would merely hang in the reed section 25d, without being wound on the spool; and on winding a twenty-seven inch loom spool for the tuft line 23—23, Fig. 20, the yarns from the first A1 (Fig. 23) would merely hang in the reed section 25a, without being wound on the loom spool.

The half-width blades 31a and 31b, at the opposite ends of each reed section 25a, 25b, 25c and 25d, are provided to maintain control of the yarns which pass through the dents of the reed where two sections of the reed abut against each other, during interchanging of the reed sections.

It will be understood that the yarn packages 50 may be in the form of spools, as shown, or in the form of so called cheeses, i. e. a package without end flanges on the core on which the yarn is wound, or in the form of cones or any other shape or physical structure coming within the term "package" as used broadly in the art, without departing from the spirit of the present invention.

It will also be understood that the various set ups disclosed in the drawings are for the purpose of illustrating the principle of the invention only, and are not to be considered as limiting in any way the manifold uses for which the setting frame of the present invention is adapted in winding loom spools for drop-match patterns, straight-match patterns or any other type of design wherein the shiftable reed sections, the angularly arranged yarn package banks, and the fixed or adjustable yarn guides intermediate the banks of yarn packages and the reed may be employed to advantage.

We claim:

1. An Axminster setting frame comprising a yarn package spool supporting table divided to form a plurality of banks of said spools, means for winding a loom spool spaced from one end of said table, a reed composed of a plurality of interchangeable sections intermediate said winding means and said table, means for removably supporting the interchangeable sections of the reed in end to end abutting relation to each other, and a plurality of multi-channel guides for groups of yarns passing from different spool banks to different interchangeable sections respectively of said reed, said guides being disposed at predetermined angles to the vertical and horizontal to afford free relative cross running of the yarns of the various groups from the spools of said banks to and through interchanged sections of said reed during winding of a loom spool.

2. An Axminster setting frame comprising a yarn package spool supporting table divided to form a plurality of banks of said spools, means for winding a loom spool spaced from one end of said table, a reed composed of a plurality of interchangeable sections intermediate said winding means and said table, means for removably supporting the interchangeable sections of the reed in end to end abutting relation to each other, a plurality of multi-channel guides for groups of yarns passing from different spool banks to different interchangeable sections respectively of said reed, said guides being disposed at predetermined angles to the vertical and horizontal to afford free relative cross running of the yarns of the various groups from the spools of said banks to and through interchanged sections of said reed during winding of a loom spool, and means affording universal adjustment of each of said guides independently to attain said predetermined positions of said guides.

3. An Axminster setting frame comprising a yarn package spool supporting table divided to form a plurality of banks of said spools, means for winding a loom spool spaced from one end of said table, a reed composed of a plurality of interchangeable sections intermediate said winding means and said table, means for removably supporting the interchangeable sections of the reed in end to end abutting relation to each other, means operable longitudinally of said reed for clamping said reed sections rigidly in said relationship within said support, and a plurality of multi-channel guides for groups of yarns passing from different spool banks to different interchangeable sections respectively of said reed, said guides being disposed at predetermined angles to the vertical and horizontal to afford free relative cross running of the yarns of the various groups from the spools of said banks to and through interchanged sections of said reed during winding of a loom spool.

4. An Axminster setting frame comprising a yarn package spool supporting table divided to form a plurality of banks of said spools, means for winding a loom spool spaced from one end of said table, a reed composed of a plurality of interchangeable sections intermediate said winding means and said table, means for removably supporting the interchangeable sections of the reed in end to end abutting relation to each other, means operable longitudinally of said reed for clamping said reed sections rigidly in said relationship within said support, interfitting rebated ends on said reed sections and said clamping means, and a plurality of multi-channel guides for groups of yarns passing from different spool banks to different interchangeable sections respectively of said reed, said guides being disposed at predetermined angles to the vertical and horizontal to afford free relative cross running of the yarns of the various groups from the spools of said banks to and through interchanged sections of said reed during winding of a loom spool.

5. An Axminster setting frame comprising a head having a groove extending transversely of said frame, a yarn dividing reed comprising a plurality of interchangeable sections each including a base bar with oppositely rebated ends adapted to be supported in interfitting end to end relation in said groove, a relatively fixed abutment with an interfitting rebated end mounted in said groove for engagement with one end of the assembled plurality of sections, and a relatively movable rebated end abutment mounted in said groove for engagement with the opposite end of the assembled plurality of sections.

6. An Axminster setting frame comprising a head having a groove extending transversely of said frame, a yarn dividing reed comprising a plurality of interchangeable sections each including a base bar with oppositely rebated ends adapted to be supported in interfitting end to end relation in said groove, a relatively fixed abutment with an interfitting rebated end mounted in said groove for engagement with one end of the assembled plurality of sections, a relatively movable rebated end abutment mounted in said groove for engagement with the opposite end of the assembled plurality of sections, a threaded block rigidly mounted in said groove beyond the last said abutment, and a screw provided with a hand wheel threaded through said block and engaging said last abutment for clamping said sections rigidly in said groove between said abutments.

7. An Axminster setting frame comprising a head having a groove extending transversely of said frame, a yarn dividing reed comprising a plurality of interchangeable sections each including a base bar with oppositely rebated ends adapted to be supported in interfitting end to end relation in said groove and a plurality of flat laterally spaced parallel blades extending transversely across substantially the full width of one face of the base bar of each section intermediate the rebated ends thereof, half-width blades on the interfitting rebated ends of adjoining sections respectively arranged with the adjacent half width blades in a common plane parallel to and uniformly spaced with the respect to the planes of the full-width blades of the sections, a relatively fixed abutment with an interfitting rebated end mounted in said groove for engagement with one end of the assembled plurality of sections, and a relatively movable rebated end abutment mounted in said groove for engagement with the opposite end of the assembled plurality of sections.

8. A reed for use in an Axminster setting frame, comprising a plurality of interchangeable sections each including a base bar with rebated opposite ends respectively, a plurality of flat spaced blades projecting from and each extending transversely of one face of said bar across and to opposite sides respectively of a plane intermediate the longitudinal marginal edges of said face, and a blade at each of the rebated ends of each section extending to one side only of said plane.

9. A reed for use in an Axminster setting frame, comprising a plurality of interchangeable sections each including a base bar with rebated opposite ends respectively, a plurality of flat spaced blades projecting from and each extending transversely of one face of said bar across and to opposite sides respectively of a plane intermediate the longitudinal marginal edges of said face, and a blade at each of the rebated ends of each section extending to one side only of said plane, said rebated ends each including a longitudinal face in a plane coincident with the first said plane.

10. A reed for use in an Axminster setting frame, comprising a plurality of interchangeable sections each including a base bar with oppositely rebated opposite ends respectively, a plurality of flat spaced blades projecting from and each extending transversely of one face of said bar across and to opposite sides respectively of a plane intermediate the longitudinal marginal edges of said face, and a blade at each of the rebated ends of each section extending to one side only of said plane, said rebated ends each including a longitudinal face in a plane coincident with the first said plane.

11. The method of setting yarns for winding loom-spools on an Axminster setting frame provided with a supporting table for yarn packages and with interchangeable reed sections, which consists in setting yarn packages in different groups for a plurality of basic design units respectively on the table of the setting frame, placing the yarns drawn from different groups in different sections of the reed respectively, and interchanging the positions of the reed sections without disturbing the positions of the yarn package groups in winding succeeding loom spools wherein the positions of the design units are interchanged on succeeding spools.

12. The method of setting yarns for winding loom spools on an Axminster setting frame provided with a supporting table for yarn packages and with interchangeable reed sections, which consists in setting the yarn packages for two identical basic design units simultaneously in corresponding positions respectively in two adjoining parallel groups on the table, leading the yarns from the packages of said groups through different adjoining reed sections respectively, and interchanging the positions of the respective reed sections with other reed sections carrying the yarns from other table supported groups of yarn packages for other basic design units respectively of the pattern without effecting interchange of the positions of the various groups of yarn packages on the table.

13. The method of setting yarns for winding loom spools on an Axminster setting frame provided with a supporting table for yarn packages and with interchangeable reed sections, which consists in setting the yarn packages for a plurality of identical basic design units in corresponding positions respectively in a plurality of adjoining parallel groups on one side of the table, setting the yarn packages for a second plurality of identical basic design units in corresponding positions respectively in a plurality of adjoining parallel groups on the opposite side of the table, leading the yarns from the packages of said groups through different adjoining reed sections respectively, and interchanging the positions of the respective reed sections with each other without effecting interchange of the positions of the various groups of yarn packages on the table.

14. An Axminster setting frame comprising a main table and a supplementary table disposed at different elevations with respect to each other and in horizontal parallel relation to each other in the direction of the length of the frame, with at least the supplementary table being disposed in a plane at an acute angle to the horizontal in the direction of the width of the frame, yarn package spindles on and projecting from each table perpendicularly to the plane thereof with the axes of the spindles on each table disposed parallel to each other, and with the spindles on said tables collectively arranged in parallel rows extending longitudinally and transversely of said frame, yarn guides at one end of said frame in predetermined relation to the longitudinal rows of spindles on said tables, said longitudinal rows of spindles being spaced apart crosswise of the frame at distances sufficient to provide longitudinal channels between the peripheries of a plurality of full yarn packages respectively mounted on said spindles, said channels being of sufficient width to afford free running of the yarns from said packages to said guides and to afford ready substitution of yarns in said channels in accordance with changes of packages on said spindles.

15. An Axminster setting frame comprising a main table and a supplementary table disposed at different elevations with respect to each other and in horizontal parallel relation to each other in the direction of the length of the frame, said tables being respectively disposed in planes at acute angles to the horizontal in the direction of the width of the frame, yarn package spindles on and projecting from each table perpendicularly to the plane thereof with the axes of the spindles on each table disposed parallel to each other, and with the spindles on said tables collectively arranged in parallel rows extending longitudinally and transversely of said frame, yarn guides at one end of said frame in predetermined relation to the longitudinal rows of spindles on said tables, said longitudinal rows of spindles being spaced apart crosswise of the frame at distances sufficient to provide longitudinal channels between the peripheries of a plurality of full yarn packages respectively mounted on said spindles, said channels being of sufficient width to afford free running of the yarns from said packages to said guides and to afford ready substitution of yarns in said channels in accordance with changes of packages on said spindles.

16. An Axminster setting frame comprising a main table and a supplementary table disposed at different elevations with respect to each other and in horizontal parallel relation to each other in the direction of the length of the frame, with said main frame disposed in a horizontal plane and the supplementary table being disposed in a plane at an acute angle to the horizontal in the direction of the width of the frame, yarn package spindles on and projecting from each table perpendicularly to the plane thereof with the axes of the spindles on each table disposed parallel to each other, and with the spindles on said tables collectively arranged in parallel rows extending longitudinally and transversely of said frame, yarn guides at one end of said frame in predetermined relation to the longitudinal rows of spindles on said tables, said longitudinal rows of spindles being spaced apart cross wise of the frame at distances sufficient to provide longitudinal channels between the peripheries of a plurality of full yarn packages respectively mounted on said spindles, said channels being of sufficient width to afford free running of the yarns from said packages to said guides and to afford ready substitution of yarns in said channels in accordance with changes of packages on said spindles.

17. An Axminster setting frame comprising a main table consisting of two laterally spaced sections respectively located at opposite sides of the longitudinal center of said frame, a supplementary table consisting of two sections adjacently disposed at opposite sides respectively of said center intermediate the spaced sections of said main table, said tables being disposed at different elevations with respect to each other and in horizontal parallel relation to each other in the direction of the length of the frame, with the sections of the supplementary table being respectively disposed in planes at acute angles to the horizontal in the direction of the width of the frame, yarn package spindles on and projecting from each table section perpendicularly to the plane thereof with the axes of the spindles on each table secton disposed parallel to each other, and with the spindles on said tables collectively arranged in parallel rows extending longitudinally and transversely of said frame, yarn guides at one end of said frame in predetermined relation to the longitudinal rows of spindles on said tables, said longitudinal rows of spindles being spaced apart crosswise of the frame at distances sufficient to provide longitudinal channels between the peripheries of a plurality of full yarn packages respectively mounted on said spindles, said channels being of sufficient width to afford free running of the yarns from said packages to said guides and to afford ready substitution of yarns in said channels in accordance with changes of packages on said spindles.

18. An Axminster setting frame comprising a main table consisting of two laterally spaced sections respectively located in a common horizontal plane at opposite sides of the longitudinal center of said frame, a supplementary table consisting of two sections adjacently disposed at opposite sides respectively of said center intermediate the spaced sections of said main table, said tables being disposed at different elevations with respect to each other and in horizontal parallel relation to each other in the direction of the length of the frame, with the sections of the supplementary table being respectively disposed in planes at acute angles to the horizontal in the direction of the width of the frame, yarn package spindles on and projecting from each table section perpendicularly to the plane thereof with the axes of the spindles on each table section disposed parallel to each other, and with the spindles on said tables collectively arranged in parallel rows extending longitudinally and transversely of said frame, yarn guides at one end of said frame in predetermined relation to the longitudinal rows of spindles on said tables, said longitudinal rows of spindles being spaced apart crosswise of the frame at distances sufficient to provide longitudinal channels between the peripheries of a plurality of full yarn packages respectively mounted on said spindles, said channels being of sufficient width to afford free running of the yarns from said packages to said guides and to afford ready substitution of yarns in said channels in accordance with changes of packages on said spindles.

19. An Axminster setting frame comprising a main table and a supplementary table disposed at different elevations with respect to each other and each consisting of two sections respectively located at opposite sides of the longitudinal center of the frame in horizontal parallel relation to each other in the direction of the length of the frame, with the sections of each table at each side of said center disposed in planes at acute angles to the horizontal in the direction of the width of the frame, yarn package spindles on and projecting from each table section perpendicularly to the plane thereof with the axes of the spindles on each table section disposed parallel to each other, and with the spindles on said table sections collectively being arranged in parallel rows extending longitudinally and transversely of said frame, yarn guides at one end of said frame in predetermined relation to the longitudinal rows of spindles on said tables, said longitudinal rows of spindles being spaced apart crosswise of the frame at distances sufficient to provide longitudinal channels between the peripheries of a plurality of full yarn packages respectively mounted on said spindles, said channels being of sufficient width to afford free running of the yarns from said packages to said guides and to afford ready substitution of yarns in said channels in accordance with changes of packages on said spindles.

RUSSELL C. GEBERT.
ROBERT J. CARSON, Jr.